United States Patent [19]
Ikeda et al.

[11] Patent Number: 6,114,014
[45] Date of Patent: Sep. 5, 2000

[54] FLOOR MAT AND PROCESS FOR PRODUCING THE SAME

[75] Inventors: Yuuki Ikeda, Tokyo; Shousuke Matsui, Hiroshima; Hiroaki Fujimoto, Hiroshima; Kazuhisa Taya, Hiroshima; Kiyokazu Nakanishi; Motofumi Kikuchi, both of Shiga, all of Japan

[73] Assignee: Japan Vilene Company, Ltd., Tokyo, Japan

[21] Appl. No.: 09/066,210

[22] Filed: Apr. 24, 1998

[30] Foreign Application Priority Data

| Aug. 29, 1997 | [JP] | Japan | 9-250052 |
| Aug. 29, 1997 | [JP] | Japan | 9-250053 |
| Aug. 29, 1997 | [JP] | Japan | 9-250054 |
| Aug. 29, 1997 | [JP] | Japan | 9-250055 |
| Dec. 15, 1997 | [JP] | Japan | 9-363163 |

[51] Int. Cl.⁷ .............................. B32B 23/02; A47G 9/06
[52] U.S. Cl. ............................. 428/192; 428/83; 428/88; 428/156; 428/167; 5/417; 264/239
[58] Field of Search .................... 428/156, 172, 428/192, 82, 23, 81, 167, 88, 130, 218; 5/417, 420; 264/239, 243, 252, 299

[56] References Cited

U.S. PATENT DOCUMENTS

| D. 313,789 | 1/1991 | Thundercloud | D12/203 |
| 5,128,189 | 7/1992 | Bartlett | 428/81 |
| 5,362,544 | 11/1994 | Reuben | 156/219 |
| 5,620,546 | 4/1997 | Reuben | 428/82 |

FOREIGN PATENT DOCUMENTS 8606691 11/1986 European Pat. Off. .
1325203 9/1970 United Kingdom .

OTHER PUBLICATIONS

Japanese Unexamined Utility Model Publication (Kokai) No. 3038014.

English Abstract of Japanese Unexamined Patent Publication (Kokai)No. 6–32167.

Japanese Examined Utility Model Publication (Kokoku) No. 58–46903.

Japanese Examined Utility Model Publication (Kokoku) No. 49–8008.

Japanese Unexamined Utility Model Publication (Kokai) No. 63–139038.

*Primary Examiner*—Donald Loney
*Attorney, Agent, or Firm*—Burgess, Ryan & Wayne

[57] ABSTRACT

A floor mat having an upper face layer and a base layer, which comprises a plane section and a marginal peripheral section surrounding the plane section, wherein at least a part of the marginal peripheral section contains a belt-like portion which is raised at the side of the upper face layer and extends continuously and substantially in parallel to a marginal peripheral edge thereof; the belt-like portion contains a channel extending longitudinally thereof at the side of the base layer; and the belt-like portion carries at least one convex-concave structure on a wall surface of the channel, with the proviso that, when the convex-concave structure extends transversely of the channel, the convex-concave structure is discontinued on at least a bottom surface of the channel, is disclosed. The floor mat according to the present invention has a sufficient peeling strength obtained by a compression process used for only a short period of time.

17 Claims, 15 Drawing Sheets

FLOOR MAT AND PROCESS FOR PRODUCING THE SAME

BACKGROUND OF THE INVENTION

1. Field of the Invention

The present invention relates to a floor mat, and a process for producing the same. More particularly, the present invention relates to a floor mat, such as one used in a passenger, trunk or cargo compartment of an automobile or an entry mat used in a shop or home, which is placed such a manner that a marginal peripheral area of the floor mat is brought into contact with a floor wall or floor walls while, in some cases, a pressure or force is applied thereto to bend the marginal peripheral area.

2. Description of the Related Art

A mat having a raised belt-like portion or banking of a marginal peripheral area, so that the peripheral area is projected from the central flat area to thereby prevent the floor of, for example, a passenger compartment of an automobile from becoming soiled by a scattering of clods of soil, sand, mud, gravel or the like out of the floor mat is known.

As a floor mat of the above type, a laminated floor mat having an upper face layer of carpeting or the like and a base layer of a molded sheet of an elastomeric flexible material is widely used. A thermoplastic elastomer is preferable for the base layer because it is relatively flexible and allows a close contact of the floor mat with a floor wall. Further, a thermoplastic elastomer has advantages in that it is recyclable, and may be molded by an ordinary molding machine in a short period of time, in a continuous manner.

In a process for producing the floor mat composed of the laminate of the upper face layer of carpeting or the like, and the base layer of the thermoplastic elastomer, however, the thermoplastic elastomer must be heated so that it can be bonded to the carpeting. A sufficient peeling strength can be obtained if the contact time is long enough, but, if the contact time is too long, the carpeting layer may be damaged by heat. Therefore, it is necessary to shorten the contact time while still obtaining a sufficient peeling strength.

U.S. Pat. No. 5,154,961 discloses a floor mat of a two-layered structure composed of (1) a base layer having a relatively thin main body section bordered by a relatively thicker edge section and (2) an upper face layer laminated thereon. The thicker edge section has a channel opening from the bottom surface, and a two-layered step portion extends from the outer edge of the thicker edge section. The step portion contains a thin lower layer extending perpendicularly from the outside wall of the thicker edge section, and an area for a bonding of the upper face layer to the base layer can be added to thereby increase the strength of the bond therebetween and the resistance to separation. As mentioned above, the floor mat disclosed in U.S. Pat. No. 5,154,961 has such a step portion containing the thin lower layer extending from the thicker edge section. However, when a force is applied to the edge section of the floor mat although the thin lower layer is easily deformed, there is very little deforming of the thick edge section, and therefore, it becomes difficult to bring the floor mat into close contact with a floor wall or floor walls. Accordingly, clods of soil, dirt or the like are liable to enter a space under the floor mat, from a gap formed between the floor wall or floor walls and the floor mat.

SUMMARY OF THE INVENTION

Accordingly, the object of the present invention is to remedy the above disadvantages of the prior art, and to provide a floor mat which is not easily damaged to an upper face layer of the carpeting or the like, has a sufficient peeling strength between the upper face layer and the base layer, and can be brought into close contact with a floor wall or floor walls, whereby clods of soil or the like are prevented from entering a space under the floor mat. Another object of the present invention is to provide a process for producing such a floor mat.

Other objects and advantages of the present invention will be apparent from the following description.

In accordance with the present invention, there is provided a floor mat having an upper face layer and a base layer, which comprises a plane section and a marginal peripheral section surrounding the plane section, wherein at least a part of the marginal peripheral section contains a belt-like portion which is raised at the side of the upper face layer (namely, at a front surface, or at a front side) and extends continuously and substantially in parallel to a marginal peripheral edge thereof; the belt-like portion contains a channel extending longitudinally thereof at the side of the base layer (namely, in a rear surface, or in a rear side); and the belt-like portion carries at least one convex-concave structure on a wall surface of the channel, with the proviso that, when the convex-concave structure extends transversely of the channel, the convex-concave structure is discontinued on at least a bottom surface of the channel.

Further, in accordance with the present invention, there is provided a process for producing the above floor mat, comprising the steps of:

supplying a sheet material for the upper face layer together with a sheet material for the base layer to a mold for a press molding of the floor mat, the material for the base layer being maintained at a temperature at which a press molding can be carried out;

carrying out a press molding; and cutting a molded sheer to obtain the floor mat.

BRIEF DESCRIPTION OF DRAWINGS

FIG. 3 is an enlarged fragmentary perspective view of a rear side of the corner portion 1a.

FIG. 4 is an enlarged fragmentary sectional view of the corner portion 1a.

DESCRIPTION OF THE PREFERRED EMBODIMENTS

One embodiment of a floor mat according to the present invention will be described hereinafter, with reference to FIGS. 1 to 4. The floor mat 1 of the present invention is a laminate of a base layer 2 of a molded elastomeric flexible sheet and an upper face layer 3 of carpeting or the like. The base layer 2 preferably carries a number of nibs 21 to prevent unwanted movement of the floor mat 1.

Figure 1:
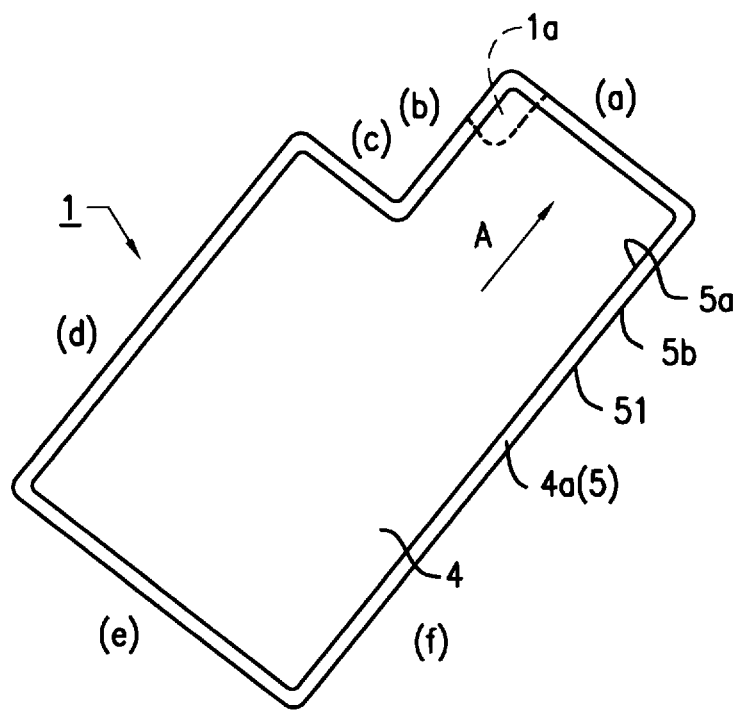
FIG. 1 is a perspective view of a floor mat according to the present invention at a front side.
Figure 2:
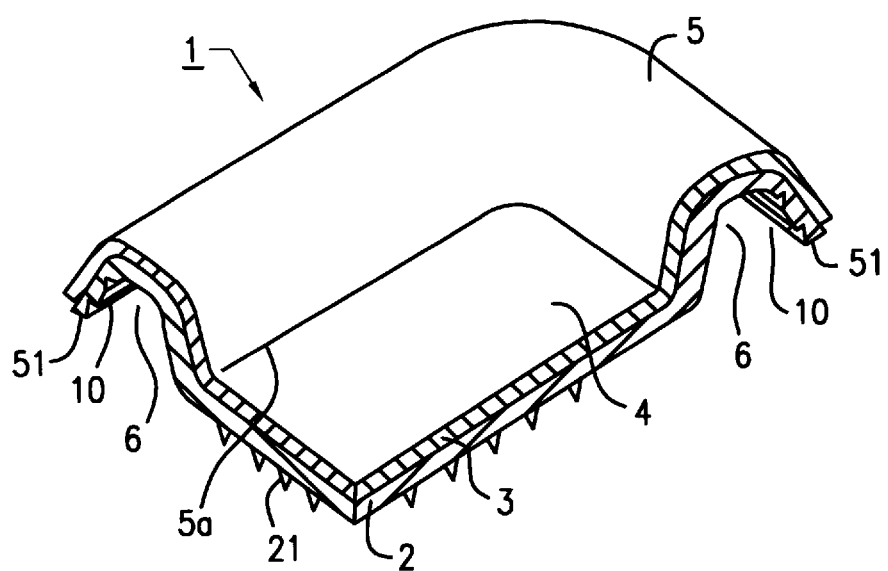
FIG. 2 is an enlarged fragmentary perspective view of a corner portion 1a (taken along a broken line of FIG. 1) of the floor mat 1 as shown in FIG. 1.
Figure 3:
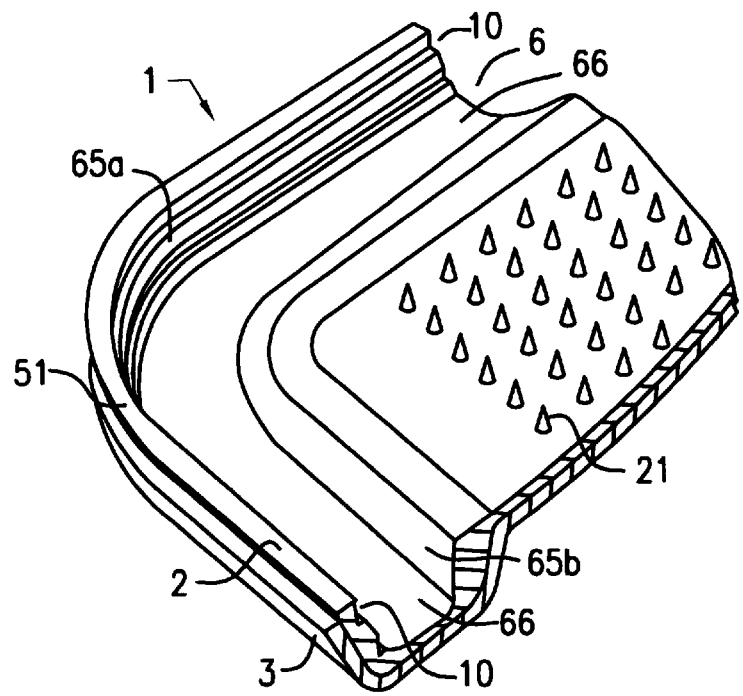
Figure 4:
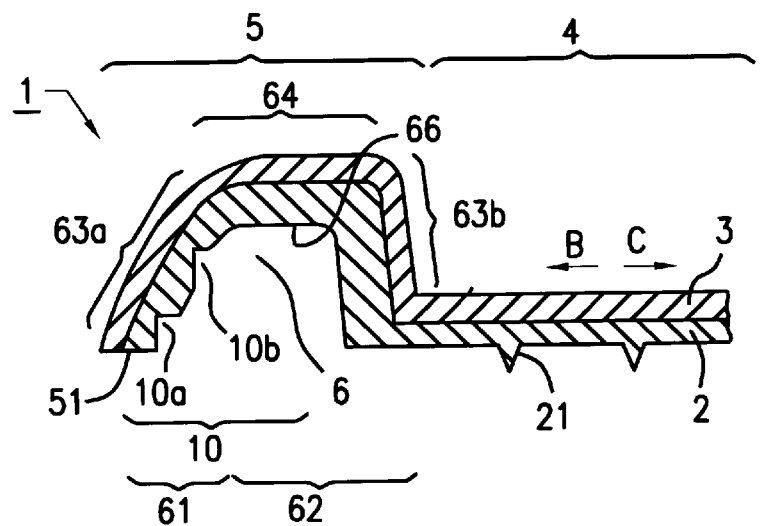

As shown in FIG. 1, the floor mat 1 according to the present invention includes a plane section 4 in a central main part and a marginal peripheral section 4a surrounding the plane section 4. The marginal peripheral section 4a contains a belt-like portion 5 which extends continuously along and substantially in parallel to a peripheral edge 51, and is raised at the side of the upper face layer, i.e., towards a front side. As shown in FIGS. 2 to 4, a channel 6 is formed at a part corresponding to the belt-like portion 5 at the side of the base layer, i.e., at a rear surface of the belt-like portion 5.

In the embodiment of the present floor mat 1 as shown in FIGS. 1 to 4, an edge 5a of the belt-like portion 5 at the side of the plane section 4 is substantially parallel to the other edge 5b of the belt-like portion 5 at the side of the peripheral edge 51, on the front surface of the floor mat 1. The floor mat 1 is generally used in such a manner that at least one peripheral edge (typically all of the peripheral edges other than peripheral edge a in FIG. 1) is brought into contact with a floor wall or floor walls, and all of the peripheral edges are substantially linear, except that corner portions thereof may be sometimes arc-shaped (the arc has a circular center at the side of the plane section). Therefore, the edge 5a of the belt-like portion 5 at the side of the plane section 4 is composed only of substantially linear edges with angular corner portions or with round corner portions. That is, in the embodiment of the present floor mat 1 as shown in FIGS. 1 to 4, a boundary between the plane section 4 and the belt-like portion 5 does not contain a zigzag line or a wave-like line in the front surface.

Preferably, the front surface of the belt-like portion 5 does not carry any projection raised from the front surface or any recess made in the rear side, and thus is smooth. A width and depth of the channel formed in the rear side of the belt-like portion 5 are not particularly limited. A thickness of the belt-like portion 5 may remain substantially the same, or may be continuously decreased or increased, longitudinally and/or transversely of the belt-like portion 5. The term "thickness" as used herein for the belt-like portion means a thickness of the base layer at the part of the belt-like portion in a laminate of the upper face layer and the base layer.

The floor mat according to the present invention carries the convex-concave structure, for example, a concave structure, (i.e., a recess), a convex structure (i.e., a projection), or a composite convex-concave structure, which is formed in a wall surface of the channel. In the embodiment of the present floor mat 1 as shown in FIGS. 1 to 4, the belt-like portion 5 carries, on the sidewall surface of the channel therein, the concave structure, i.e., two grooves 10a, 10b continuously extending longitudinally of the belt-like portion 5, as the convex-concave structure 10. The grooves 10a, 10b are formed on a surface of one of the sidewalls of the channel, i.e., on a surface of the sidewall 65a at the side of the peripheral edge 51, in the embodiment of the present floor mat 1 as shown in FIGS. 1 to 4. However, the floor mat according to the present invention may carry one or more convex-concave structures on at least a part of the surfaces of the sidewalls and/or the bottom of the channel. Therefore, one or more grooves may be formed on at least a part of the wall surfaces of the channel, i.e., the sidewall surface at the side of the peripheral edge, the sidewall surface at the side of the plane section, or the bottom surface of the channel.

The shape of the concave structure (i.e., the recess) is not particularly limited. For example, the shape shown to be perpendicular to the sidewall or bottom surface carrying the concave structure may be a continuous belt-like recess, discontinued belt-like recess, or dot-like recess. The continuous belt-like recess continuously extends longitudinally of the belt-like portion. The belt-like portion may carry only one continuous belt-like recess, but preferably a plurality of continuous belt-like recesses as shown in FIGS. 3 and 4 are formed, because the peeling strength between the base layer and the upper face layer is thus enhanced, and because the belt-like portion can be deformed by a pressure applied thereto to maintain a close contact with a floor wall or floor walls. If multiple continuous belt-like recesses extending transversely across the channel are formed, the belt-like portion may become more rigid, and therefore, a required close contact with a floor wall or floor walls cannot be maintained. Therefore, when the concave structure extends transversely of the channel, the concave structure is discontinued at least on a bottom surface of the channel.

The discontinued belt-like recess may extend in any direction, for example, longitudinally or transversely of the belt-like portion. Also, the direction of the belt-like portion may be inclined from the longitudinal or transverse direction. When a plurality of discontinued belt-like recesses are formed, the extending direction of each of recesses is not necessarily, but is preferably, orientated into one direction parallel to each other. Preferably, the discontinued belt-like recess extends longitudinally of the belt-like portion, as this allows a curling of the floor mat to be effectively prevented. The size of the concave structure, such as a groove, is not particularly limited.

The shape (shown perpendicular to the wall surface of the channel) of the dot-like recess is not particularly limited. For example, there may be mentioned a usual circle, ellipse, sector or polygon, or a combination thereof. As the concave structure (i.e., the recess), the continuous belt-like recess, discontinued belt-like recess, or dot-like recess may be used alone or as a combination thereof.

The sectional shape (transverse section) of the concave structure is not particularly limited, but may be, for example, a U-shaped recess (such as a semicircle, or semiellipse), a V-shaped recess (such as a polygon), or a combination thereof. The V-shaped recess is preferable because such a recess has an angular bottom which will enhance the peeling strength between the base layer and the upper face layer.

Figure 5:
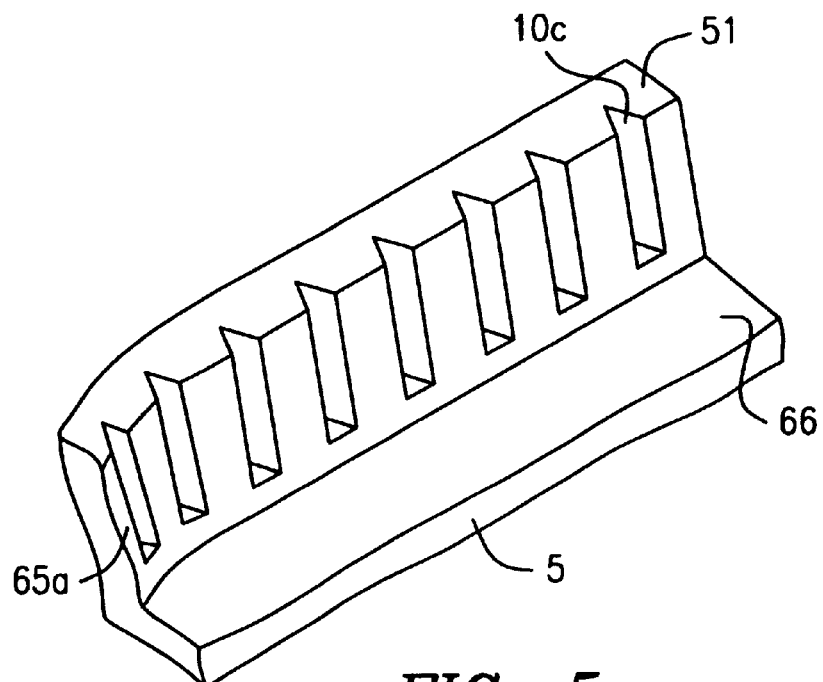
FIG. 5 is an enlarged fragmentary perspective view of a sidewall carrying grooves in a channel at a rear side.

FIG. 5 is an enlarged fragmentary perspective view at the rear side of one embodiment of the discontinued belt-like recesses or grooves extending transversely of the channel. More particularly, the belt-like portion 5 carries on the sidewall 65a of the channel 6 at the side of the peripheral edge 51 grooves 10c, each of which extends from the edge 51 but does not reach the bottom 66 of the channel. So long as the discontinued belt-like recess or groove is not transversely and continuously crossing the bottom of the channel, the portion at which the discontinued belt-like recesses or grooves are formed is not particularly limited. Further, the size of the recess or the groove extending transversely of the channel as shown in FIG. 5 is not particularly limited.

Figure 6:
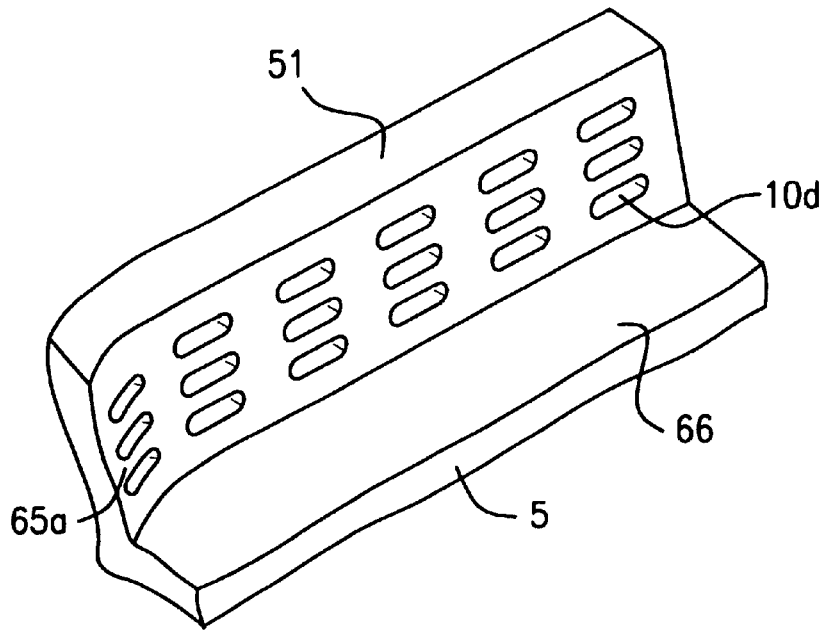
FIG. 6 is an enlarged fragmentary perspective view of a sidewall carrying another type of grooves in a channel at a rear side.

FIG. 6 illustrates one embodiment of the dot-like recesses, as an enlarged fragmentary perspective view of the rear side. More particularly, the belt-like portion 5 carries dot-like recesses 10d on the sidewall 65a of the channel at the side of the peripheral edge 51. The portion at which the dot-like recesses are formed is not particularly limited. Further, the size of the the dot-like recesses 10d as shown in FIG. 6 is not particularly limited.

Figure 7:
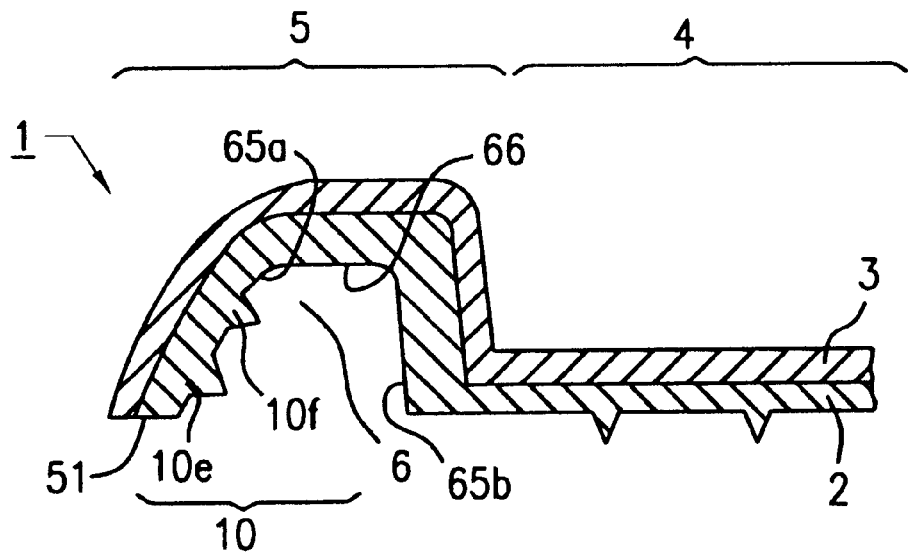
FIG. 7 is an enlarged fragmentary sectional view of a belt-like portion carrying projections on the sidewall of a channel.

The floor mat according to the present invention may also carry a convex structure (i.e., a projection) raised from a wall surface of the channel to the rear side, as the convex-concave structure. In the embodiment of the present floor mat 1 as shown in FIG. 7, the belt-like portion 5 carries, on the sidewall 65a of the channel 6 at the side of the peripheral edge 51, two projections 10e, 10f extending continuously and longitudinally of the belt-like portion 5, as the convex-concave structure 10. The floor mat according to the present invention may carry one or more projections on at least a part of the wall surfaces of the channel, i.e., the sidewall surface at the side of the peripheral edge, the sidewall surface at the side of the plane section, or the bottom surface of the channel.

Figure 9:
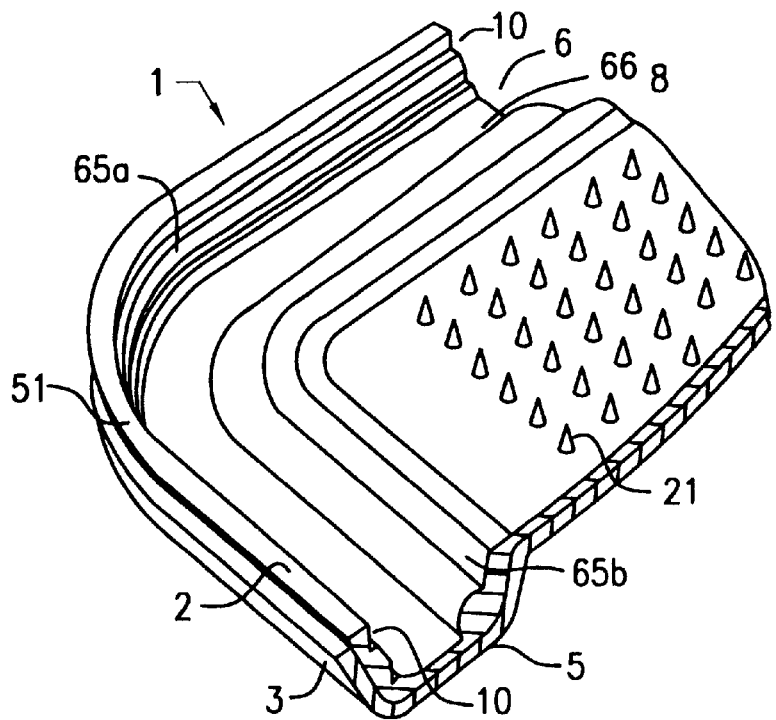
FIG. 9 is an enlarged fragmentary perspective view of a rear side corner portion of the floor mat having a ridge portion and grooves.
Figure 10:
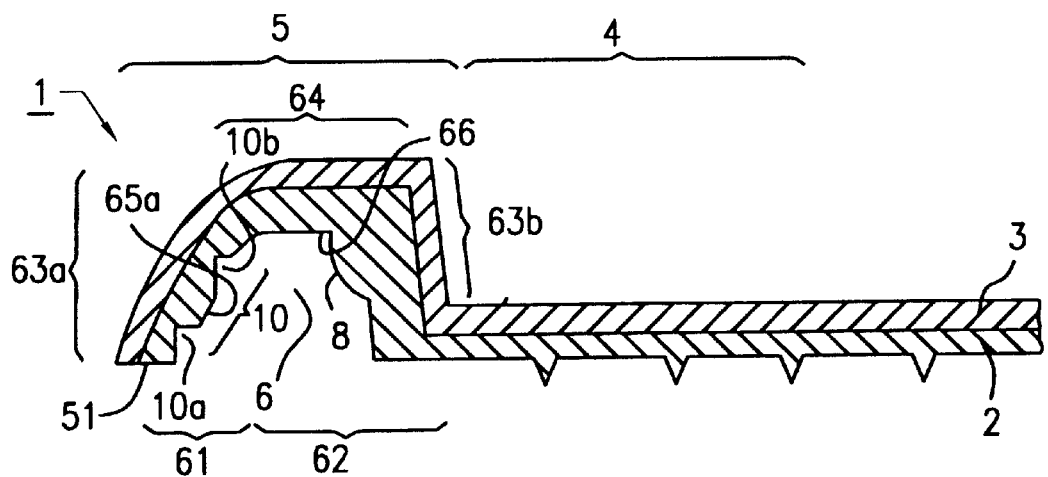
FIG. 10 is a sectional view of the belt-like portion of FIG. 9.

The convex structure (i.e., the projection) may be a continuous belt-like projection, such as a ridge portion as shown in FIGS. 9 and 10, a discontinued belt-like projection (a discontinued projected plate as shown in FIGS. 11 to 20), or a dot-like projection. The ridge portion continuously extends longitudinally of the belt-like portion. The channel may carry only one ridge portion, but preferably a plurality of ridge portions are used because the peeling strength between the base layer and the upper face layer is thus enhanced. If multiple ridge portions extending transversely across the channel are formed, the belt-like portion may become more rigid and therefore, a close contact thereof with a floor wall or floor walls cannot be maintained. Therefore, when the convex structure extends transversely of the channel, the convex structure is discontinued on at least a bottom surface of the channel.

The discontinued projected plate may extend in any direction, for example, longitudinally or transversely of the belt-like portion. Also, the direction may be inclined from the longitudinal or transverse direction of the belt-like portion. When a plurality of discontinued projected plates are formed, the extending direction of each of the plates is not necessarily, but is preferably, orientated into one direction parallel to each other.

The shape (shown perpendicular to the wall surface of the channel) of the dot-like projection is not particularly limited. For example, there may be mentioned a usual circle, ellipse, sector, polygon, or a combination thereof. As the convex structure (i.e., the projection), the continuous belt-like projection (e.g., the ridge portion), the discontinued projected plate, or the dot-like projection may be used alone or in a combination thereof, or in a combination with one or more of the concave structures.

A border edge of the convex structure and the wall of the channel, i.e., a foot of the convex structure, may be round, but preferably is angular, because such an angular edge will enhance the peeling strength between the base layer and the upper face layer.

Figure 8:
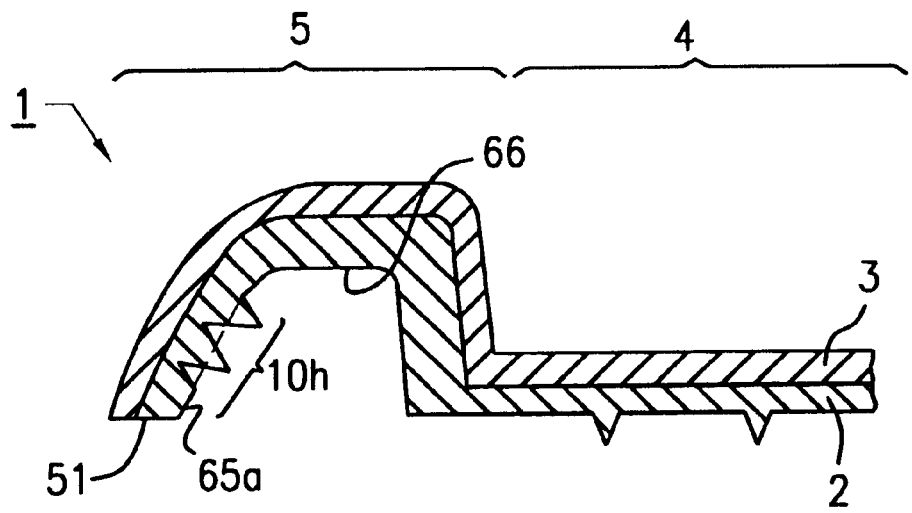
FIG. 8 is an enlarged fragmentary sectional view of a belt-like portion carrying a composite convex-concave structure on the sidewall of a channel.

The floor mat according to the present invention may also carry a composite convex-concave structure which contains alternately one or more convex structures and one or more concave structures, i.e., a repetition of one or more units of a convex structure and a concave structure, on a wall surface of the channel as the convex-concave structure. Preferably, the composite convex-concave structure continuously extends longitudinally of the belt-like portion. In the embodiment of the present floor mat 1 as shown in FIG. 8, the belt-like portion 5 carries, on the sidewall 65a of the channel 6 at the side of the peripheral edge 51, a composite convex-concave structure 10h, extending continuously and longitudinally of the belt-like portion 5, as the convex-concave structure. The composite convex-concave structure may continuously or discontinuously extend longitudinally or transversely of the belt-like portion. A typical example of the composite convex-concave structure is a combination of one or more grooves and one or more ridge portions, each of which extends continuously in parallel and alternately of the belt-like portion, as shown in FIG. 8.

The floor mat according to the present invention may carry one or more composite convex-concave structures on at least a part of the surfaces of the sidewalls and/or the bottom of the channel. The composite convex-concave structure may contain at least one portion which is a foot of the convex structure and at the same time a bottom of the concave structure, i.e., a foot/bottom portion. The foot/bottom portion may be round, but is preferably angular because an angular foot/bottom portion will enhance the peeling strength between the base layer and the upper face layer.

When the floor mat according to the present invention, which is a laminate of the upper face layer and the base layer thereof and contains one or more convex-concave structures in the channel of the belt-like portion, is produced by a usual press molding process, a molding pressure is not uniformly applied to the laminate because of the presence of the convex-concave structure in the channel, particularly because of the presence of the bottom (preferably the angular bottom) of the concave structure in the channel, the foot (preferably the angular foot) of the convex structure in the channel, or the foot/bottom (preferably the angular foot/bottom) of the composite convex-concave structure in the channel. Namely, a greater molding pressure is applied to some parts than to others, and thus a peeling strength of the upper face layer and the base layer will be enhanced thereat. It is preferable to prevent a peeling at a marginal peripheral section of a laminate floor mat. Therefore, preferably the convex-concave structure is formed on the sidewall surface of the channel at the side of the marginal peripheral edge, to thereby enhance the peeling strength of the upper face layer and the base layer at the side of the marginal peripheral section. More preferably the convex-concave structure is formed to continuously extend longitudinally of the belt-like portion all over the wall surfaces of the channel, to thereby enhance the peeling strength over all of the belt-like portion.

According to the present invention, a sufficient peeling strength can be obtained from the convex-concave structure, as shown above. Therefore, it is not necessary to form the two-layered step portion extending outside from the outer edge of the thicker edge section as disclosed in U.S. Pat. No. 5,154,961. As shown in FIGS. 3 and 4, the base layer in the edge portion of the belt-like portion 5 at the side opposite to the plane section 4 extends linearly or curvilinearly and does not contain any branch structures.

According to the present invention, the convex-concave structure can be formed on the wall surface of the channel, i.e., the inside surface (or rear side surface) of the belt-like portion, and thus the shape of the front surface of the belt-like portion is not affected. It is possible to produce the floor mat according to the present invention in such a manner that, when the belt-like portion is observed from the front side, the portion carrying the convex-concave structure on the rear side cannot be distinguished from the portion not carrying the convex-concave structure. Therefore, the floor mat as shown in FIGS. 1 to 4 has a most suitable design.

In the present invention, the convex-concave structure formed in the channel of the belt-like portion can impart a deformability or a form-stability to the belt-like portion, in addition to the enhancement of the peeling strength. Generally, the convex structure contributes to the form-stability, whereas the concave structure contributes to the deformability, if there is no difference in the wall thickness of the belt-like portion between the portions with and without the convex-concave structure.

For example, the belt-like portion 5 of the floor mat 1 as shown in FIGS. 1 to 4 carries on the sidewall 63a of the channel 6 the grooves 10a, 10b at the side of the peripheral edge 51, whereas each of the ceiling 64 and the sidewall 63b at the side of the plane section 4 is thicker than the sidewall 63a at the side of the peripheral edge 51. In the belt-like portion 5 of the floor mat 1 as shown in FIGS. 1 to 4, the sidewall 63a serves as a deformable region which extends continuously and longitudinally of the belt-like portion and can be deformed by a pressure applied to the belt-like portion, whereas each of the ceiling 64 and the sidewall 63b serves as a form-stable region which extends continuously and longitudinally of the belt-like portion and can maintain a shape of the belt-like portion against any pressure applied to the belt-like portion.

The floor mat of the present invention is generally used in such a manner that at least one peripheral edge is in close contact with a floor wall. Therefore, the floor mat is subjected to a force that pushes it towards the floor wall (in the direction of the arrow B in FIG. 4) or a force that pulls it away from the floor wall (in the direction of the arrow C in FIG. 4). For example, when a pushing force is applied to the belt-like portion 5 of the floor mat 1 as shown in FIGS. 1 to 4 from the side of the plane section 4 in the direction of the arrow B in FIG. 4, the sidewall 63a (the deformable region 61) carrying the grooves 10a, 10b is flexibly bent to thereby narrow the width of the channel 6, whereas the ceiling 64 and the other sidewall 63b (the form-stable region 62) can maintain the shape thereof against such a pushing force. Conversely, when a pulling force is applied to the belt-like portion 5 for the side of the plane section 4 in the direction of the arrow C in FIG. 4, the sidewall 63a (the deformable region 61) which has been bent is restored to thereby broaden the width of the channel 6, whereas the ceiling 64 and the other sidewall 63b (the form-stable region 62) can maintain the shape thereof against such a pulling force. If the thickness of the wall carrying the concave structure is substantially the same as that of the wall without the concave structure, the wall carrying the concave structure serves as the deformable region and the wall without the concave structure serves as the form-stable region. Further, if the thickness of the wall carrying the convex structure is substantially the same as that of the wall without the convex structure, the wall carrying the convex structure serves as the form-stable region and the wall without the convex structure serves as the deformable region. Preferably, the belt-like portion contains both the deformable region (more preferably carrying one or more concave structures), and the form-stable region (more preferably carrying one or more convex structures), each of which extends longitudinally of the belt-like portion.

When the belt-like portion in the floor mat of the present invention contains the deformable region and the form-stable region, a close contact of the floor mat with the floor wall or floor walls is easily obtained and the ingress of the clods of soil or the like between the floor mat and the floor effectively prevented.

The part at which the concave structure, such as a groove, can be formed in the channel is not particularly limited. For example, the concave structure may be formed in the sidewalls (i.e., the sidewall at the side of the peripheral edge or the sidewall at the side of the plane section) or the bottom (or the ceiling) of the channel to effectively prevent unwanted movement of the mat. However, the concave structure is preferably formed on the sidewall at the side of the peripheral edge, because the belt-like portion carrying the concave structure is not greatly deformed as a whole when a force is applied thereto, and a close contact with a floor wall or floor walls can be effectively obtained.

In the floor mat according to the present invention, the convex structure which imparts the peeling strength, and at the same time, the form-stability to the belt-like portion can be formed in the channel therein.

For example, one or more ridge portions extending continuously and longitudinally of the belt-like portion can be provided as the convex structure on a part of one of the sidewall surfaces of the channel, a part of the bottom surface of the channel, or a corner area covering a part of one of the sidewall surfaces and a part continuous thereto of the bottom surface of the channel. The ridge portion can be provided as the convex structure alone (i.e., without the concave structure) or in combination with the concave structure, or in combination with one or more of other convex structures.

Referring to FIGS. 9 and 10, the belt-like portion 5 of the floor mat 1 of the present invention contains a ridge portion 8 on the surface of the channel 6, at a corner area covering the surface of a part of the bottom 66 and the surface of a part of the sidewall 65b at the side of the plane section 4.

The sectional shape of the ridge portion is not particularly limited, and can be suitably determined by taking into account the sectional shape of the channel, the desired peeling strength, and the desired form-stability. For example, the sectional shape of the ridge portion is a general sector, triangle, square, or the like. Preferably, the sectional shape of the ridge portion is substantially the same in the longitudinal direction of the belt-like portion, but the sectional shape of the ridge portion may be changed continuously and/or discontinuously in the longitudinal direction of the belt-like portion.

The ridge portion can be provided on the wall surface of the channel in such a way that the shape of the front surface of the belt-like portion is not affected. It is possible to form the belt-like portion in such a manner that, when the belt-like portion is observed from the front side, the portion carrying the ridge portion on the rear side cannot be distinguished from the portion not carrying the ridge portion. Therefore, the floor mat having one or more ridge portions has a most suitable design.

In the floor mat 1 as shown in FIGS. 9 and 10, the sidewall 63a carrying the grooves 10a, 10b serves as the deformable region 61, whereas the ceiling 64 (at least a part thereof carrying the ridge portion) and the sidewall 63b serve as the form-stable region 62.

As the convex structure which can impart the peeling strength, and at the same time, the form-stability to the belt-like portion, the channel of the belt-like portion can carry a plurality of projected pieces (such as projected plates) which are projected (within the channel towards the rear side) from at least a part of one of the sidewall surfaces of the channel, or a corner area covering at least a part of one of sidewall surfaces and a part continuous thereto of the bottom surface of the channel, or a part of the bottom of the channel, and which are formed separately from each other and discontinuously in a longitudinal direction of the belt-like portion.

The belt-like portion can carry a group of the projected pieces (such as the projected plates) as mentioned above on only one sidewall of the channel or only one corner area covering at least a part of one of sidewall surfaces and a part continuous thereto of the bottom surface of the channel, or on both sidewalls of the channel, or both corner areas covering at least a part of one of sidewall surfaces and a part continuous thereto of the bottom surface of the channel.

Figure 11:
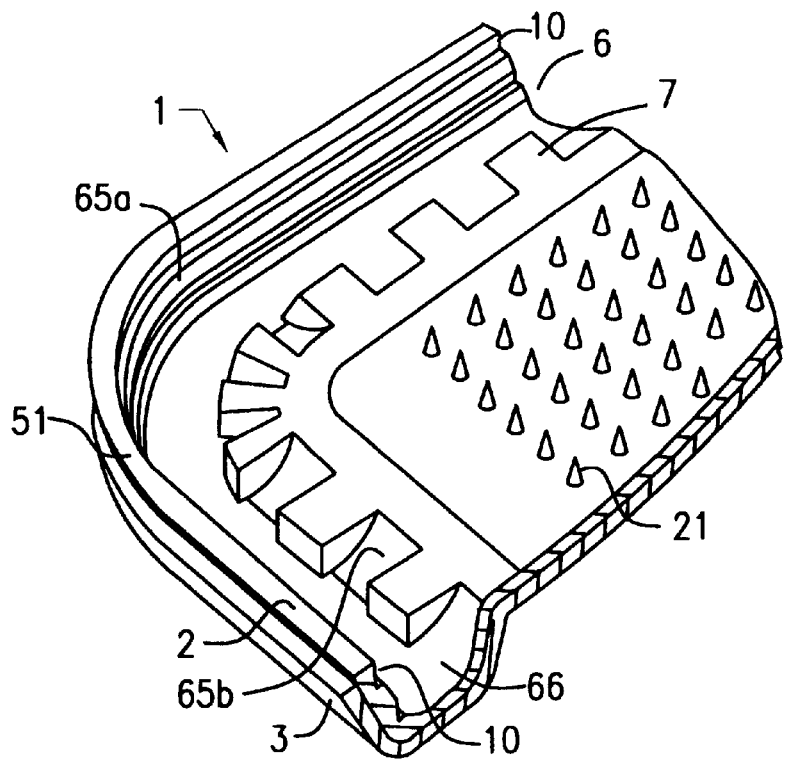
FIG. 11 is an enlarged fragmentary perspective view of a rear side corner portion of the floor mat having projected plates and grooves.
Figure 12:
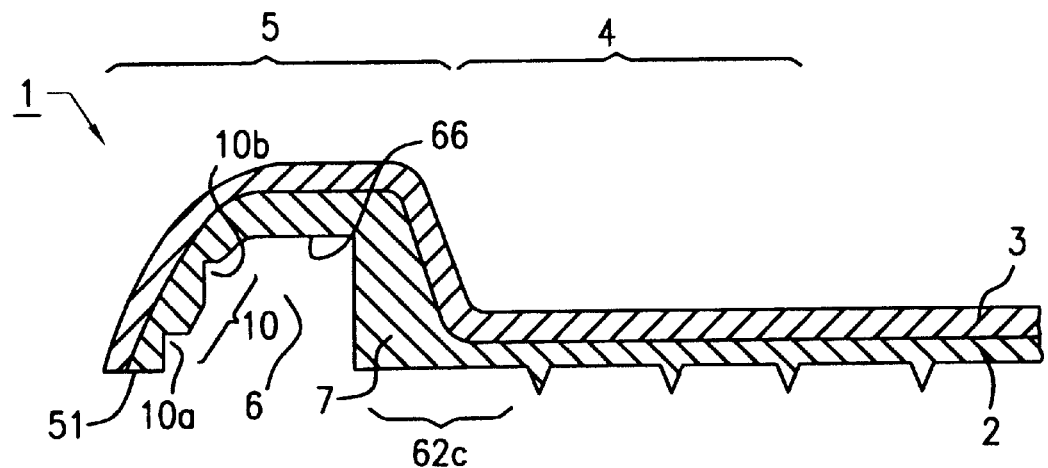
FIG. 12 is a sectional view of the belt-like portion of FIG. 11.

An embodiment wherein a group of the projected plates is formed on only one sidewall is illustrated in FIGS. 11 and 12. As shown in FIGS. 11 and 12, the projected plates 7 can be provided on a corner portion covering the whole sidewall surface 65b at the side of the plane section 4 and a part of the bottom surface 66 continuous thereto, in the channel 6 of the belt-like portion 5. The projected plates 7 are preferably projected perpendicularly from the sidewall surface 65b, as shown in FIG. 11, but the direction in which the projected plates are projected may be deflected from the perpendicular direction. On the sidewall surface 65b, the projected plate 7 reaches the rear surface of the base layer as shown in FIG. 12, but need not reach the rear surface of the base layer.

Further, the projected plate cannot be extended transversely across the channel so that the deformable region extending continuously and longitudinally of the belt-like portion can be provided in the ceiling and the other sidewall of the channel. More particularly, the top surface opposing the other sidewall in the projected plate cannot be allowed to reach the other sidewall of the channel, i.e., the projected plate cannot be extended from one edge of the bottom surface of the channel to the other edge of the bottom surface of the channel. If a projected plate extending transversely across the channel is formed, the belt-like portion may become more rigid and thus a close contact of the floor mat with a floor wall or floor walls cannot be maintained.

The shape of the projected plate is not particularly limited and can be suitably determined by taking into account the sectional shape of the channel, and the desired peeling strength and form-stability. For example, a pillar or a column having a sectional shape of a general rectangle, square, half circle, trapezoid, arc, triangle, or the like may be mentioned. Preferably, a plurality of projected plates having an identical shape are regularly placed separately at identical intervals. However, a plurality of projected plates having different shapes or sizes may be combined, or the intervals between the projected plates may be differed.

The belt-like portion of the floor mat of the present invention can carry a group of the projected pieces (such as the projected plates) as mentioned above on each of the sidewalls of the channel. In this embodiment, an end at a central side in a transverse direction of each of projected pieces in one group is separated from an end at a central side in a transverse direction of each of projected pieces in the other group, so that the ends do not come into contact with each other; and the end at a central side in a transverse direction of each of projected pieces in one group will not enter or can enter a gap formed between the projected pieces in the other group. The groups of the projected pieces are preferably provided in such a manner that the deformable region extending continuously (linearly or not linearly) and longitudinally of the belt-like portion can be provided in the ceiling of the belt-like portion.

Figure 13:
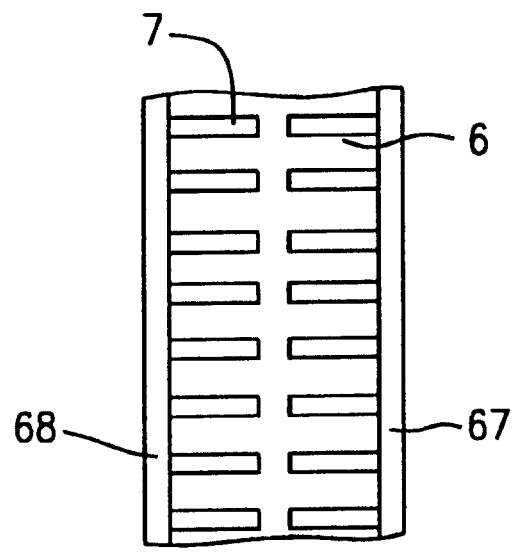
FIG. 13 is a fragmentary bottom view schematically illustrating an arrangement of plates projected into a channel.
Figure 14:
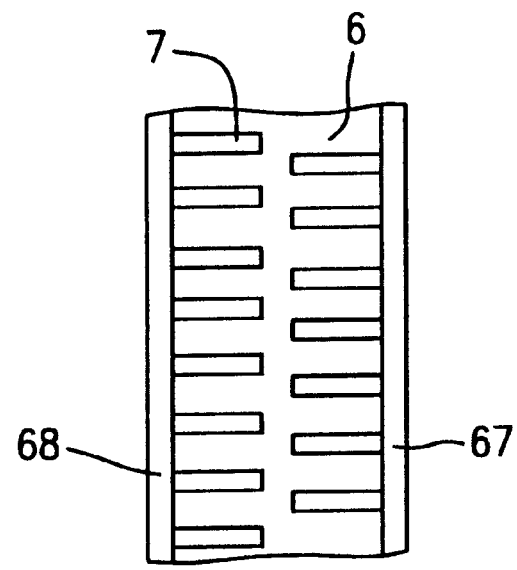
FIG. 14 is a fragmentary bottom view schematically illustrating another arrangement of plates projected into a channel.
Figure 15:
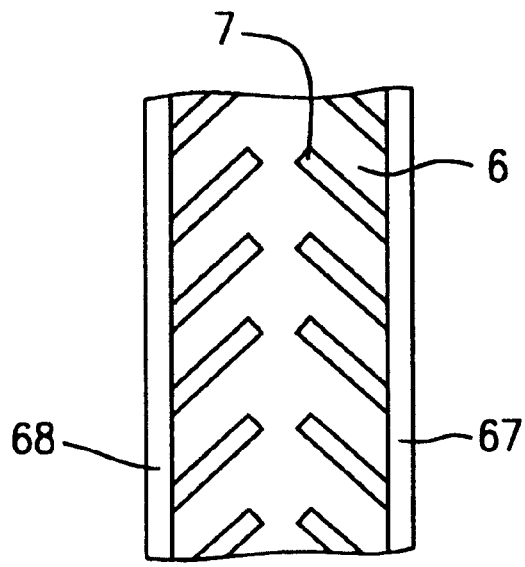
FIG. 15 is a fragmentary bottom view schematically illustrating still another arrangement of plates projected into a channel.
Figure 16:
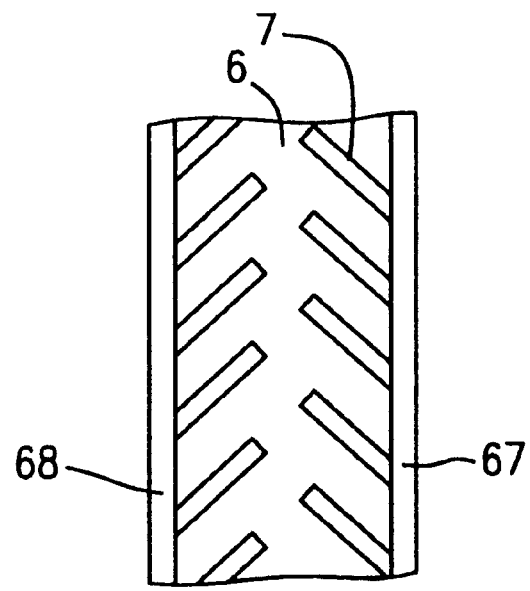
FIG. 16 is a fragmentary bottom view schematically illustrating still another arrangement of plates projected into a channel.
Figure 17:
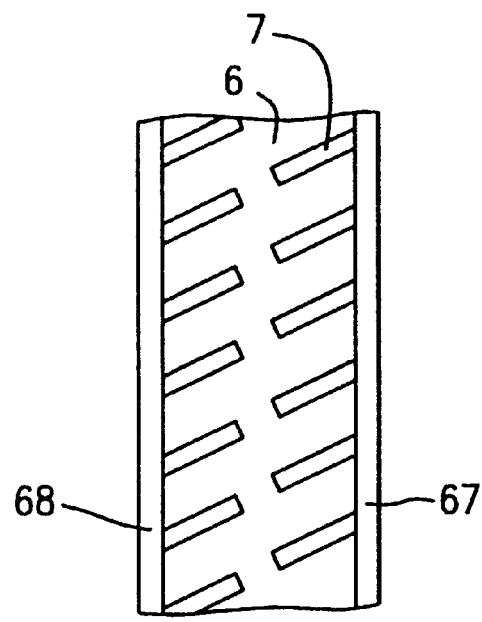
FIG. 17 is a fragmentary bottom view schematically illustrating still another arrangement of plates projected into a channel.
Figure 18:
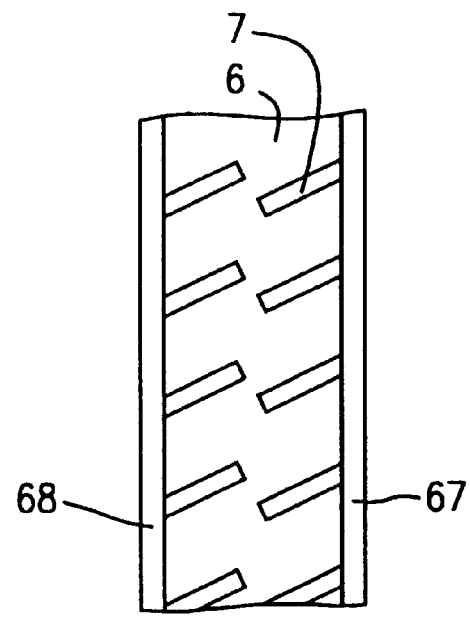
FIG. 18 is a fragmentary bottom view schematically illustrating still another arrangement of plates projected into a channel.

Various arrangements which can be applied to the projected plates are shown in FIGS. 13 to 18, which are fragmentary bottom views schematically illustrating only the arrangements of the projected plates 7 in the channel 6, in relation to the edge 67 of the belt-like portion at the side of the marginal peripheral edge 51 and the edge 68 of the belt-like portion at the side of the plane section. As illustrated in FIGS. 13 and 14, the projected plates 7 in each group are projected perpendicularly from the wall surface of a corner area covering at least a part of one of the sidewall surfaces and a part continuous thereto of the bottom surface of the channel, opposite each other (FIG. 13) or alternately (FIG. 14). As illustrated in FIGS. 15 and 16, the directions of the plates 7 projected from the corner area in each group are deflected from the perpendicular direction by the same angle to the longitudinal directions of the belt-like portion from each of the walls of the channel, in such a manner that the central ends of the projected plates are opposite each other (FIG. 15) or alternate (FIG. 16). As illustrated in FIGS. 17 and 18, the directions of the plates 7 projected from the corner area in each group are deflected from the perpendicular direction to the same direction (i.e., in a parallel direction), in such a manner that the central ends of the projected plates are opposite each other (FIG. 17) or alternate (FIG. 18).

Figure 19:
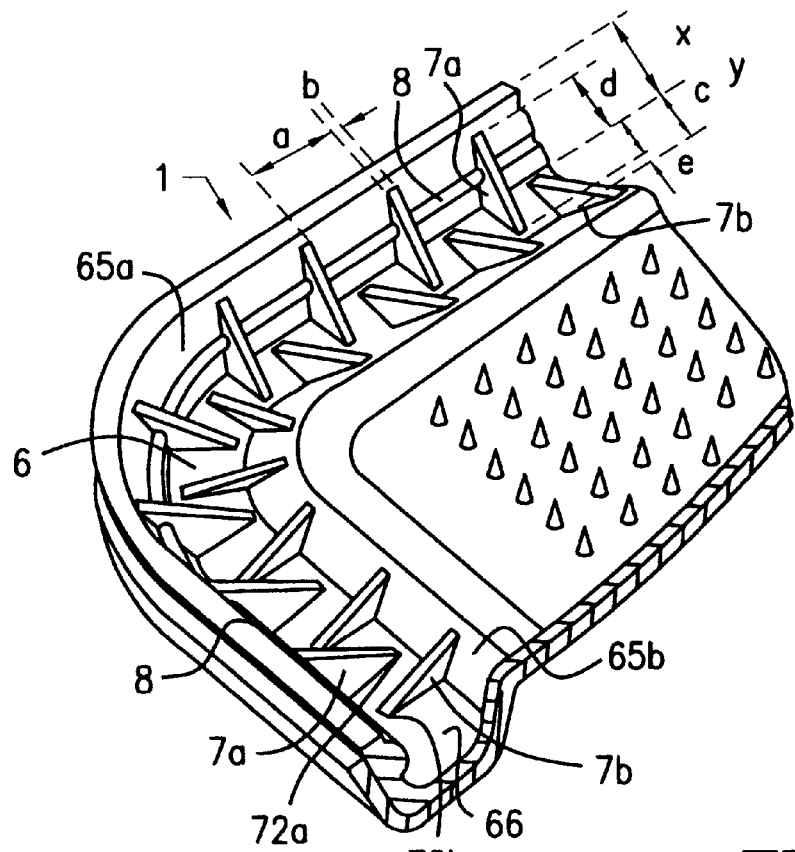
FIG. 19 is an enlarged fragmentary perspective view of a rear side corner portion of the floor mat having plates projected and a ridge portion.
Figure 20:
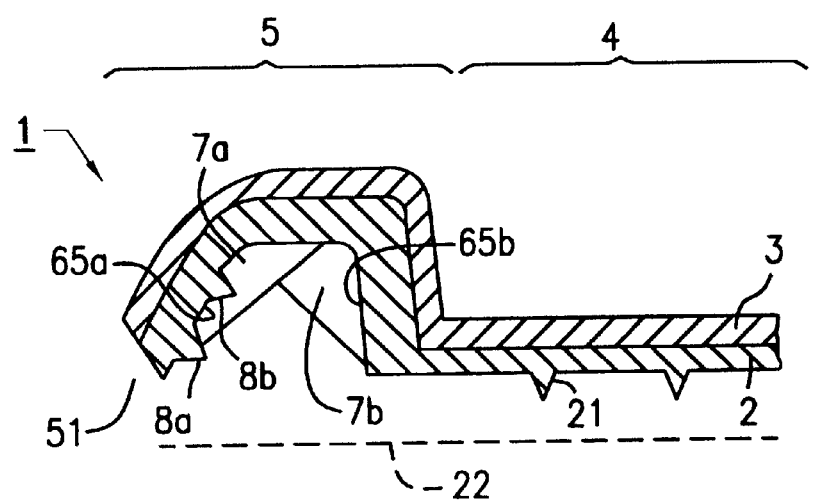
FIG. 20 is an enlarged fragmentary sectional view of the belt-like portion having plates projected and two ridge portions.

Still another arrangement of the projected plates as mentioned above on each of the corner areas of the channel is shown in FIG. 19 (a perspective view of the rear side of one embodiment) and FIG. 20 (a sectional view of another embodiment). As illustrated in FIGS. 19 and 20, a first group of the triangle plates 7a is projected perpendicularly from the corner area of the sidewall surface 65a and the bottom surface continuous thereto, whereas a second group of the triangle plates 7*b* is projected perpendicularly from the corner area of the sidewall surface 65*b* and the bottom surface continuous thereto. On the bottom surface 66 of the channel 6, each central end 72*a* (i.e., an end 72*a* at a central side in a transverse direction) of projected plates 7*a* in the first group enters a gap formed between the projected plates 7*b* in the second group, whereas each central end 72*b* (i.e., an end 72*b* at a central side in a transverse direction) of projected plates 7*b* in the second group enters a gap formed between the projected plates 7*a* in the first group.

The size of the projected plate as shown in FIGS. 11 to 20 is not particularly limited. For example, the projected plates as shown in FIG. 19, which are formed in the channel 6 having the width (x) of the sidewalls 65*a*, 65*b* of about 5 to 30 mm and the width (y) of the bottom surface 66 of about 5 to 50 mm, preferably have a thickness (b) of about 2 to 50 mm, a side length (d) of about 1 to 35 mm on the sidewalls 65*a*, 65*b*, and another side length (c) of about 3 to 47 mm on the bottom surface 66. Therefore, the distance (e) between the central end 72*a*, 72*b* and the edge of the bottom is about 3 to 47 mm. Further, the distance (a) between each triangle plate is about 10 to 100 mm.

The projected plates as shown in FIGS. 11 to 20 can be formed on the wall surface of the channel, i.e., the inside surface (or rear side surface) of the belt-like portion, so that the shape of the front surface of the belt-like portion is not affected. It is possible to produce the floor mat according to the present invention in such a manner that, when the belt-like portion is observed from the front side, the portion carrying the projected plates on the rear side cannot be distinguished from the portion not carrying the projected plates. Therefore, the floor mat as shown in FIGS. 11 to 20 has a most suitable design.

The projected plates as shown in FIGS. 11 to 20 can be formed in combination with one or more of the other convex-concave structures to improve the peeling strength, the deformability and/or the form-stability of the belt-like portion. For example, as shown in FIGS. 11 and 12, the projected plates 7 are provided on one sidewall 65*b* and two grooves 10*a*, 10*b* continuously extend longitudinally of the belt-like portion 5, as the concave structures 10 are provided on the other sidewall 65*a*.

Further, as shown in FIG. 19, the projected plates 7*a*, 7*b* are formed on both sidewalls 65*a*, 65*b*, and the ridge portion 8 extending continuously and longitudinally of the belt-like portion 5, and interrupted with the projected plates 7*a*, is formed on the sidewall 65*a*. As shown in FIG. 20, the projected plates 7*a*, 7*b* are formed on both sidewalls 65*a*, 65*b*, and two ridge portions 8*a*, 8*b* extending continuously and longitudinally of the belt-like portion 5, and interrupted with the projected plates 7*a*, are formed on the sidewall 65*a*. In the embodiments as shown in FIGS. 19 and 20, the convex-concave structure composed of one or more ridge portions 8 and the projected plates 7*a* continuously extends longitudinally of the belt-like portion 5, as a whole.

Figure 21:
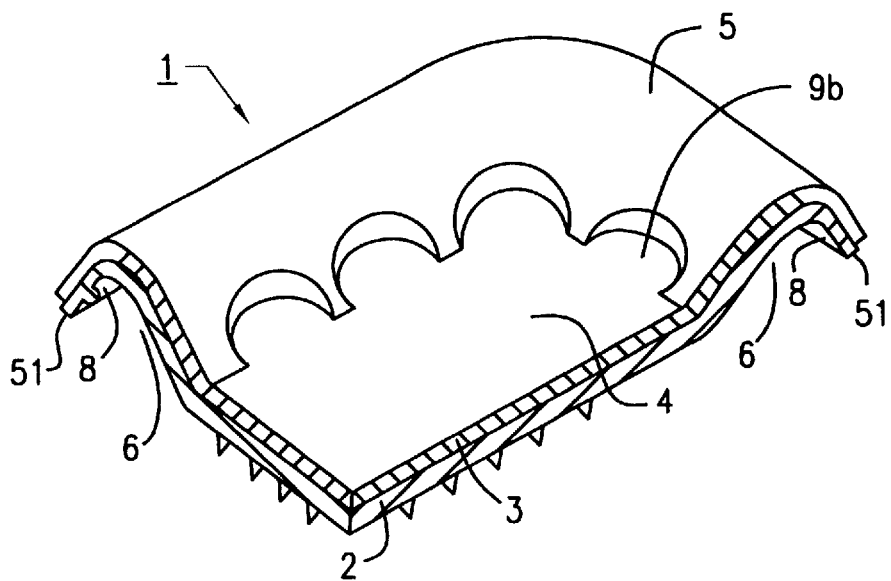
FIG. 21 is an enlarged fragmentary perspective view of a front side corner portion of the floor mat having pressed portions.
Figure 22:
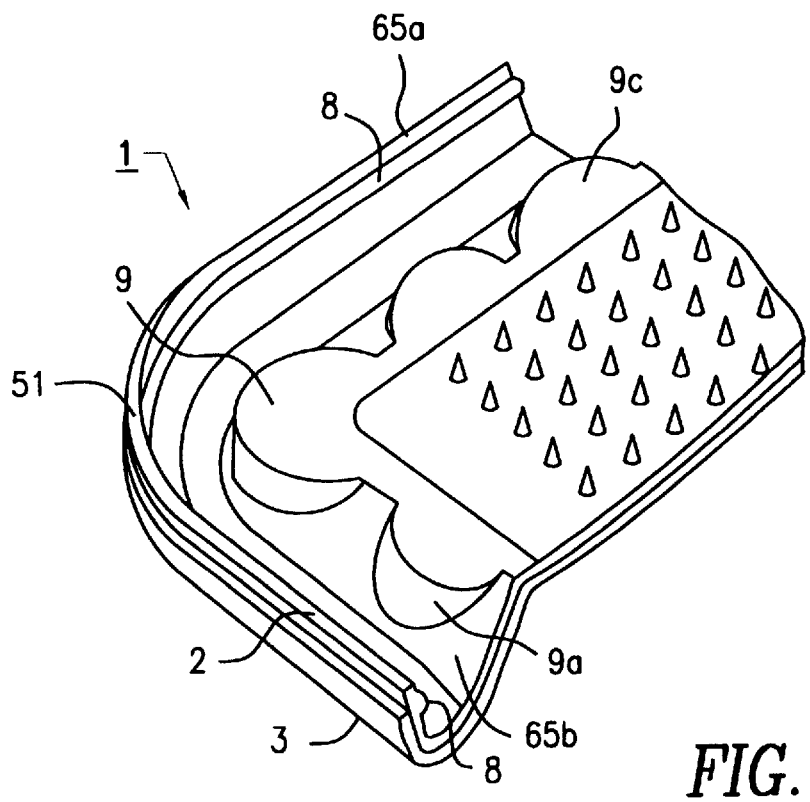
FIG. 22 is an enlarged fragmentary perspective view of a rear side corner portion of FIG. 21.

As the convex structure which can impart the peeling strength, and at the same time, the form-stability to the belt-like portion, the belt-like portion can contain a plurality of pressed portions formed separately from each other. Such a pressed portion is raised towards the rear side, and on the front surface, has a recess having a shape corresponding to the raised portion in the rear surface. For example, as illustrated in FIGS. 21 and 22, pressed portions 9 are formed on the sidewall 65*b* and the projected hollow column 9*a* is formed on the rear face, whereas the corresponding recess 9*b* is formed on the front face. As shown in FIGS. 21 and 22, in this embodiment the bottom face (or the rear face) 9*c* of the projected hollow column 9*a* preferably reaches the rear face of the base layer 2, but the bottom face may not reach the rear face of the base layer. The pressed portions can be provided on a sidewall at the side of the plane section or at the side of the peripheral edge, or on both sidewalls, or on a ceiling or one or more corner areas covering a part of one of the sidewall and a part continuous thereto of the ceiling. When the pressed portions are provided on both sidewalls, preferably they are formed separately from each other to thus provide a deformable region extending continuously and longitudinally of the belt-like portion at least in the ceiling of the belt-like portion.

The shape of the pressed portion is not particularly limited and can be suitably determined by taking into account the sectional shape of the channel, and the desired peeling strength and form-stability. For example, a hollow pillar or a hollow column having a sectional shape of a general rectangle, square, half circle, trapezoid, arc, triangle, or the like may be mentioned. Preferably, a plurality of pressed portions having an identical shape are regularly placed separately at identical intervals. However, a plurality of pressed portions having different shapes or sizes may be combined, or the intervals between the pressed portions may differ.

The pressed portion can be formed in combination with one or more of the other convex-concave structures, to thus improve the peeling strength, the deformability and/or the form-stability of the belt-like portion. For example, as shown in FIGS. 21 and 22, the pressed portions 9 are provided on one sidewall 65*b* and the ridge portion 8 extending continuously and longitudinally of the belt-like portion 5 is formed on the sidewall 65*a*.

The front surface of the pressed portion has a recess, and therefore, it is possible to produce the floor mat according to the present invention with a decorative design.

In the floor mat of the present invention, the marginal edge of the marginal peripheral section is also the edge of the belt-like portion. The length of the sidewall of the belt-like portion at the side of the peripheral section is not particularly limited. Preferably, the marginal edge reaches at least the level of the rear surface of the base layer, as shown in FIGS. 4, 7, 8, 10, and 12. Further, the marginal edge may reach the level of the pointed tops of the nibs provided to avoid unwanted movement, i.e., the level 22 of FIG. 20. The marginal edge can extend beyond, i.e., outside, the level of the pointed tops of the nibs. More preferably, as illustrated in FIG. 20, the marginal edge 51 extends between the level of the rear surface of the base layer and the level 22 of the tops of the nibs 21, to thereby improve the close contact of the floor mat with a floor wall or floor walls. This is because, when the floor mat having the marginal edge elongated to the level between the level of the rear surface of the base layer and the level 22 of the tops of the nibs 21 is placed on the floor, the elongated part over the level of the rear surface of the base layer can be easily deformed upwards the floor wall or floor walls.

In the floor mat according to the present invention, the form-stable region can be formed independently of the convex-concave structures. For example, the floor mat according to the present invention, at least one of a whole sidewall at the plane section side of the belt-like portion, a whole sidewall at the marginal peripheral edge side of the belt-like portion, or a whole ceiling of the belt-like portion has a thickness capable of maintaining a shape of the belt-like portion against a pressure applied thereto. As explained with reference to FIGS. 1 to 4, the belt-like portion contains one or more thicker walls as the form-stable region. The thickness of the form-stable region can be substantially the same, or be continuously decreased or increased, with respect to the direction longitudinally of and/or transversely across the belt-like portion.

As apparent from the above description, the term "channel" as used herein means a recess formed in the belt-like portion at the back side and containing the sidewalls and the ceiling. The thickness of the belt-like portion containing the channel may be substantially the same, or continuously decreased or increased, with respect to the direction longitudinally of and/or transversely across the belt-like portion. The sectional shape of the channel in the transverse direction is not particularly limited, but for example, a semicircle, half ellipse, polygon, such as a trapezoid (see FIGS. 2 to 4), square, rectangle (the ceiling being a long or short side) or triangle, or a combination thereof.

Preferably, the belt-like portion 5 is provided in all of the marginal peripheral section 4a as illustrated in FIG. 1, but may be formed in at least a part of the marginal peripheral section. For example, when the floor mat 1 as shown in FIG. 1 is used in a passenger compartment of an automobile, a force from driver's feet is applied thereto in the running direction (the arrow A in FIG. 1). A sliding movement due to the above force can be prevented by forming the belt-like portions 5 in the peripheral edges c and e. Further, the sliding movement due to the force applied when the driver gets in and out of the automobile can be prevented by forming the belt-like portions 5 in the peripheral edges b, d and f.

A material for the base layer of the floor mat of the present invention may be the same as those used in a conventional floor mat, for example, thermoplastic resins, such as thermoformable polyvinyl chloride, ethylene-vinyl acetate copolymer, or polyethylene; thermoplastic elastomers, such as thermoplastic styrene elastomers, thermoplastic polyolefin elastomers, or thermoplastic polyvinyl chloride elastomers; thermosetting resins, such as phenol resins, polyurethanes, or unsaturated polyester resins; or natural rubbers or synthetic rubbers, such as styrene-butadiene rubber, butadiene rubber, isoprene rubber, or nitrile-butadiene rubber. The hardness of the thermoformable material (Shore A hardness) is preferably 50 to 90, more preferably 65 to 80.

Of the above materials, the thermoplastic elastomers are preferably used because they are relatively flexible and contribute to a close contact with a floor wall or floor walls. Further, the thermoplastic elastomers can be recycled, and further, can be continuously molded by an ordinary molding machine for a short period of time.

As thermoplastic styrene elastomers, for example, thermoplastic polystyrene-polybutadiene-polystyrene (SBS) elastomer or thermoplastic polystyrene-polyisoprene-polystyrene (SIS) elastomer may be used. As polyolefin thermoplastic elastomers, for example, blends of olefin rubbers such as ethylene-propylene-diene terpolymer (EPDM) and olefin resins such as polypropylene, alloys or block copolymers thereof may be used. As thermoplastic polyvinyl chloride elastomers, for example, a blend of nitrile rubber and polyvinyl chloride is preferably used. The thermoplastic elastomers may be cross-linked.

Of the thermoplastic elastomers, the thermoplastic olefin elastomers are preferably used because of the light-weight and excellent weather resistance thereof.

As the upper face layer, a tufted carpeting, a needle punched carpeting, or a woven base fabric or the like can be used.

Figure 24:
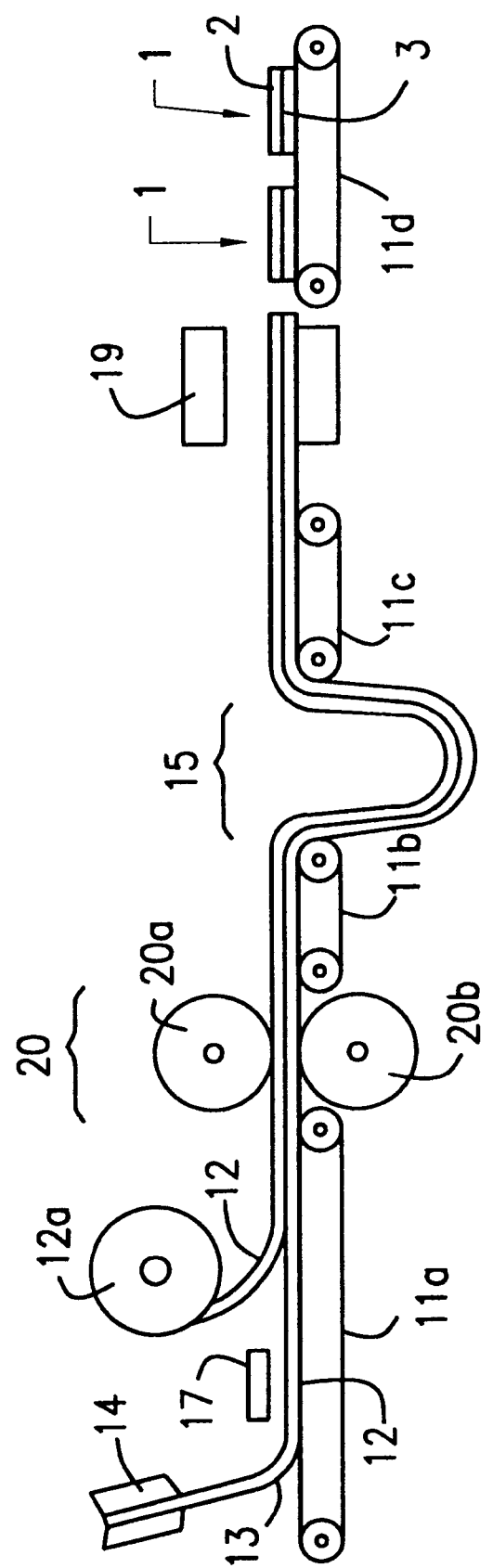
FIG. 24 schematically illustrates another process for producing the floor mat of the present invention.
Figure 25:
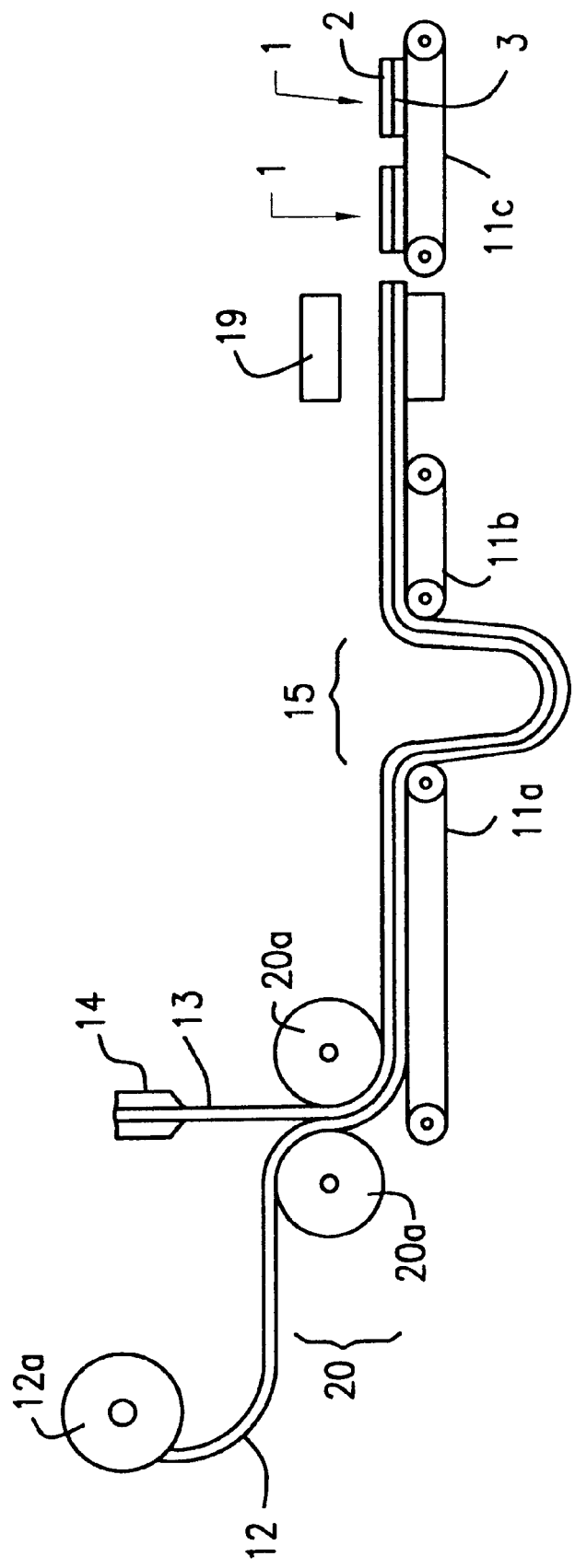
FIG. 25 schematically illustrates still another process for producing the floor mat of the present invention.

The floor mat of the present invention may be produced by various methods. When the thermoplastic material is used, the following methods as shown in FIGS. 23 to 25 are preferably used.

Figure 23:
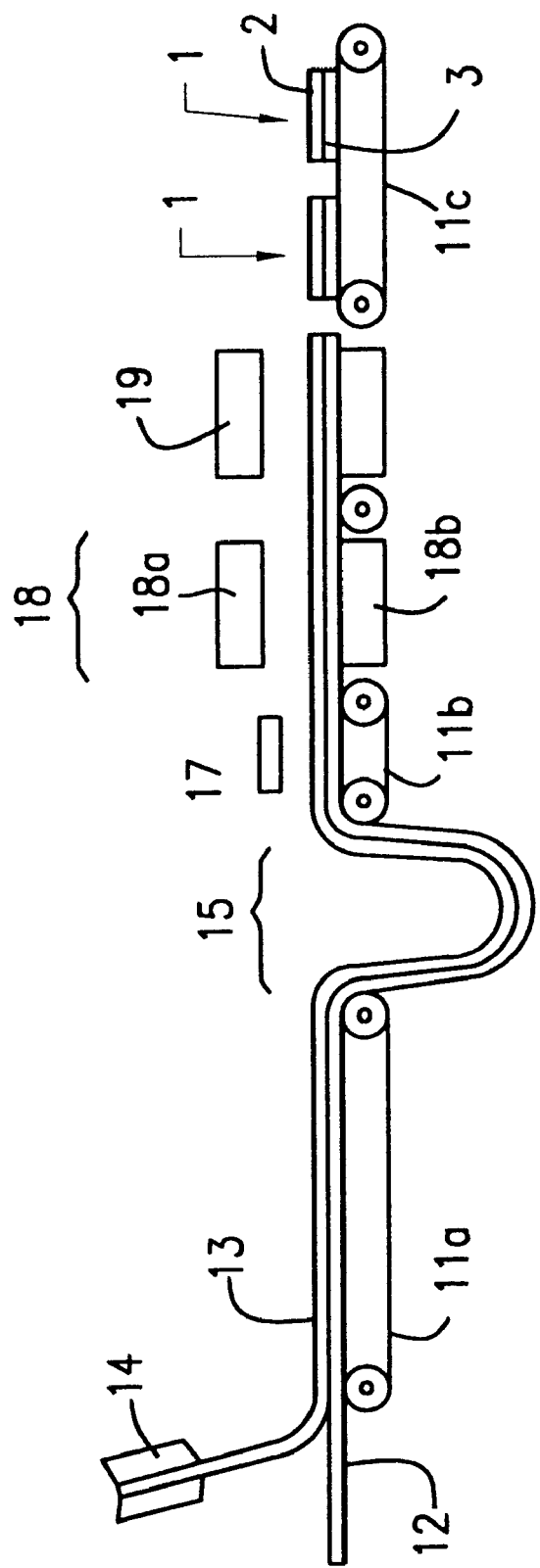
FIG. 23 schematically illustrates a process for producing the floor mat of the present invention.

As shown in FIG. 23, the thermoplastic elastomer sheet 13 is supplied from an extrusion nozzle 14 onto a carpeting 12 for the upper face layer which is supplied from a roll (not shown) and conveyed on a belt conveyer 11a. Alternatively, the thermoplastic elastomer sheet 13 can be supplied from the extrusion nozzle 14 directly onto the belt conveyer 11a, and after placing the carpeting 12 thereon, it is conveyed to the next step.

Subsequently, the resulting laminate is conveyed, optionally via a buffer space 15, to an auxiliary heater 17 by a belt conveyer 11b. In the auxiliary heater 17, the elastomer sheet 13 is heated to a temperature at which a press molding can be carried out in the next compression step. If the elastomer sheet 13 is maintained at the temperature at which a press molding can be carried out, it is not necessary to heat the elastomer sheet 13 in the auxiliary heater 17.

The laminate is conveyed by the belt conveyer 11b to a compression machine 18, which has been cooled to a temperature lower than an ordinary temperature. Then, the belt conveyer 11b is intermittently stopped, and in the compression machine 18, a pair of molds 18a, 18b which have been cooled to a temperature lower than an ordinary temperature are moved up or down, successively, to form the plane section 4, the belt-like portion 5 at the marginal peripheral section 4a surrounding the plane section 4, one or more of the convex-concave structures, and optionally, nibs 21, and to bond the carpeting 12 and the elastomer sheet 13.

The mold 18a contains convex-concave structures corresponding to the convex-concave structures to be formed in the floor mat 1 of the present invention. In the compression step, the pressure is not uniformly applied to the contacting surface of the upper face layer (the carpeting 12) and the base layer (the thermoplastic elastomer sheet 13), namely, a greater pressure is applied at the corresponding convex structures of the mold 18a. Therefore, if the total force applied in the compression step in the present invention is the same as that applied in a conventional compression step wherein a mold without the convex-concave structures is used, a difference occurs in the force applied to some parts of the bonding surface. The upper face layer (the carpeting 12) and the base layer (the thermoplastic elastomer sheet 13) can be strongly bonded at the positions where a greater force is applied, and the peeling strength therebetween is enhanced. As a result, the peeling strength between the upper face layer and the base layer is enhanced overall. Further, a sufficient peeling strength can be obtained by the treatment for a short period of time, and the upper face layer (the carpeting) will not be damaged.

Thereafter, the press-molded laminate is conveyed to a cutting apparatus 19, where it is cut at the marginal peripheral edges thereof to obtain the floor mat 1 of the present invention, which can be conveyed by a belt conveyer 11c. The cutting apparatus can be placed in the compression machine 18 to carry out the compression and cutting at the same time. Preferably, the intermittent stops are synchronized to the treatments in the compression machine 18 and the cutting apparatus 19. The buffer space 15 is preferably located to generally adjust the continuous movement of the belt conveyer 11a and the discontinuous movement of the belt conveyer 11b.

Alternatively, as shown in FIG. 24, the thermoplastic elastomer sheet 13 is supplied from an extrusion nozzle 14 onto a belt conveyer 11a, and conveyed to an auxiliary heater 17 by a belt conveyer 11a. Then, a carpeting 12 for the upper face layer is supplied from a roll stand 12a and placed on the elastomer sheet 13. In the auxiliary heater 17, the elastomer sheet 13 is heated to a temperature at which a press molding can be carried out in the next compression step, using embossing rolls 20a, 20b which have been cooled to a temperature lower than an ordinary temperature. If the elastomer sheet 13 is maintained at the temperature at which a press molding can be carried out, it is not necessary to heat the elastomer sheet 13 in the auxiliary heater 17. Alternatively, the thermoplastic elastomer sheet 13 can be supplied from the extrusion nozzle 14 onto the carpeting 12 on the belt conveyer 11a.

Subsequently, the resulting laminate is conveyed to an embossing apparatus 20, where the laminate is passed through the cooled embossing rolls 20a, 20b to form the plane section 4, the belt-like portion 5 at the marginal peripheral section 4a surrounding the plane section 4, one or more of the convex-concave structures, and optionally, nibs 21, and to bond the carpeting 12 and the elastomer sheet 13.

The embossing roll 20b contains the convex-concave structures corresponding to the convex-concave structures to be formed in the floor mat 1 of the present invention. In the embossing step, the pressure is not uniformly applied to the contacting surface of the upper face layer and the base layer. Therefore, if the total force applied in the embossing step is the same as that applied in the embossing step wherein an embossing roll without the convex-concave structures is used, a difference occurs in the force applied to the bonding surface. The upper face layer and the base layer can be strongly bonded at the positions where a greater force is applied, and the peeling strength therebetween is improved. As a result, the peeling strength between the upper face layer and the base layer is enhanced overall. Further, a sufficient peeling strength can be obtained in the treatment for a short period of time, and the upper face layer (the carpeting) will not be damaged.

Thereafter, the embossed laminate is conveyed, optionally via a buffer space 15, to a cutting apparatus 19, where the belt conveyer 11c is intermittently stopped, and the laminate is cut at the marginal peripheral edges to obtain the floor mat 1 of the present invention, which can be conveyed by a belt conveyer lid. The buffer space 15 is preferably located to generally adjust the continuous movement of the belt conveyers 11a, 11b and the discontinuous movement of the belt conveyer 11c.

Further, as shown in FIG. 25, the carpeting 12 for the upper face layer from the roll stand 12a and the thermoplastic elastomer sheet 13 from an extrusion nozzle 14 can be supplied directly to the synchronized embossing rolls 20a, 20b, which are parallelly located. In this embodiment, it is not necessary to use the auxiliary heater, because the thermoplastic elastomer sheet 13 can be supplied at the temperature at which the compression step can be carried out, using embossing rolls 20a, 20b which have been cooled to a temperature lower than an ordinary temperature.

The laminate is passed through the cooled embossing rolls 20a, 20b in the embossing apparatus 20 to form the plane section 4, the belt-like portion 5 at the marginal peripheral section 4a surrounding the plane section 4, one or more of the convex-concave structures, and optionally, nibs 21, and to bond the carpeting 12 and the elastomer sheet 13.

The embossing roll 20b contains the convex-concave structures corresponding to the convex-concave structures to be formed in the floor mat 1 of the present invention. In the embossing step, the pressure is not uniformly applied to the contacting surface of the layers. Therefore, if the total force applied is the same as that applied in the embossing step wherein an embossing roll without the convex-concave structures is used, a difference occurs in the force applied to the bonding surface. The upper face layer and the base layer can be strongly bonded at the positions where a greater force is applied, and the peeling strength therebetween is improved. As a result, the peeling strength between the layers will enhanced overall. Further, a sufficient peeling strength can be obtained in the treatment for a short period of time, and the upper face layer (the carpeting) will not be damaged.

Thereafter, the embossed laminate is conveyed, optionally via a buffer space 15, to a cutting apparatus 19, where the belt conveyer 11b is intermittently stopped, and the laminate is cut at the marginal peripheral edges to obtain the floor mat 1 of the present invention, which can be conveyed by a belt conveyer 11c. The buffer space 15 is preferably located to generally adjust the continuous movement of the belt conveyer 11a and the discontinuous movement of the belt conveyer 11b.

When the thermosetting resin or uncured rubber is used, the floor mat of the present invention can be produced using a compression machine which can be heated, instead of the compression machine which has been cooled to a temperature lower than an ordinary temperature.

The floor mat of the present invention can be used as a floor mat in a passenger compartment of an automobile or an entry mat used in a shop or home, which is placed in such a manner that a marginal peripheral edge of the floor mat is brought into contact with a floor wall or floor walls, while in some cases a pressure or force is applied thereto to bend the marginal peripheral edge.

EXAMPLES

The present invention will now be further illustrated by, but is by no means limited to, the following Examples.

Example 1

Figure 26:
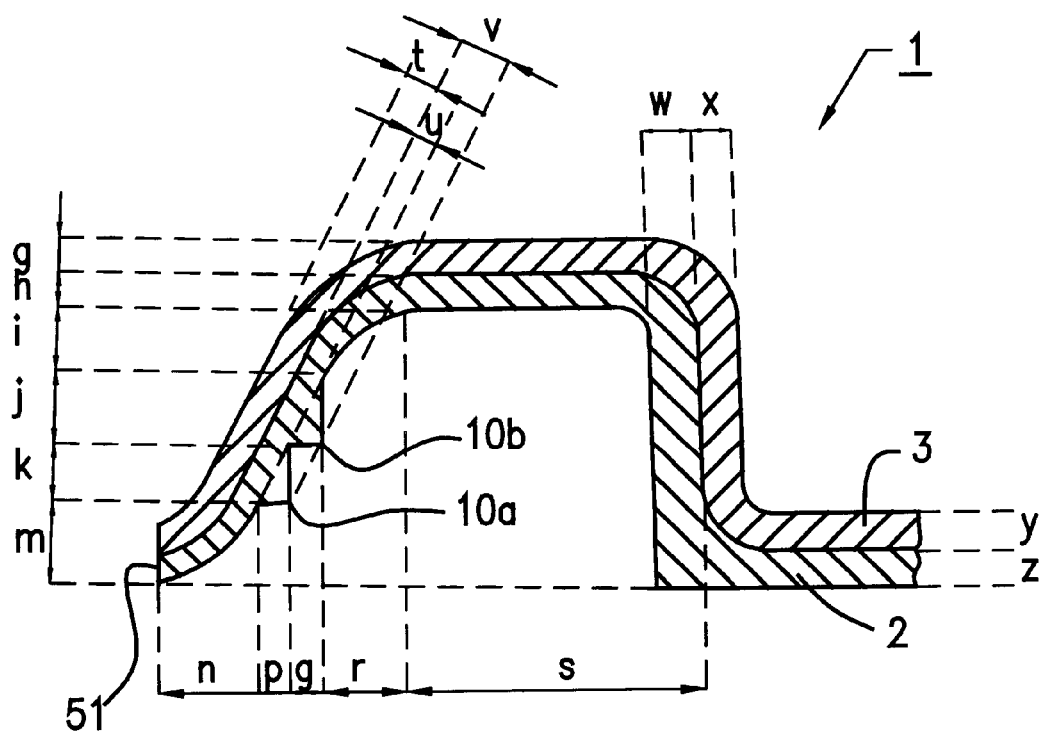
FIG. 26 is an enlarged fragmentary sectional view of the belt-like portion of the floor mat prepared in Example 1.

In the present Example, the floor mat 1 of a laminate composed of the base layer 2 of a thermoplastic elastomer sheet and an upper face layer 3 of a carpeting, having the sizes as shown in FIG. 26, was produced.

A styrene-butadiene copolymer sheet having a thickness of 1.4 mm was used as the thermoplastic elastomer sheet for the base layer, and a tufted carpeting having a pile height of 6 mm and an area density of 700 g/m$^2$ was used as the upper face layer. A pair of molds capable of producing the floor mat as shown in FIG. 26 was used. The sizes of the floor mat were as follows:

g=6.0 mm; h=1.5 mm; i=2.5 mm; j=2.0 mm; k=2.0 mm; m=3.5 mm; n=3.6 mm; p=0.7 mm; q=0.7 mm; r=1.2 mm; s=7.5 mm; t=6.0 mm; u=0.8 mm; v=1.5 mm; w=1.5 mm; x=6.0 mm; y=6.0 mm; z=1.0 mm;

The styrene-butadiene copolymer sheet was heated to about 185° C. (at which a compression can be performed, using cooled molds) and melted. The carpeting was set on the melted copolymer sheet, and the laminate was pressed in the molds for 7 seconds to bond and integrate the carpeting and the copolymer sheet. The compression was carried out under a pressure of 25 kgf/cm$^2$, while a pair of the molds had been cooled with water to a temperature lower than an ordinary temperature.

Comparative Example 1

The procedure in Example 1 was repeated, except that a pair of molds producing a floor mat without the two ridge portions 10a, 10b were used instead of the molds used in Example 1, to obtain a comparative floor mat.

Peeling Strength

The peeling strength of each of the resulting floor mats prepared in Example 1 and Comparative Example 1 was measured by a tensile strength tester (Tensilon UTM-III-100; ORIENTEC). A sample (50 mm×25 mm) was cut from each of the resulting channel parts of the belt-like portion of floor mats and set on the tester. The edge of the carpeting layer was fixed by a chuck, and the edge of the base layer was also fixed by another chuck. The distance between the two chucks was 20 mm. The edges were pulled for a distance of 30 mm (i.e., from the marginal peripheral edge to the center of the ceiling) at a pulling rate of 200 mm/min, to measure the maximum peeling strength thereof. The average peeling strength was determined by carrying out the above test five times for each of the floor mats prepared in Example 1 and Comparative Example 1.

The average maximum peeling strength of the floor mat of the present invention was 7.95 kgf/25 mm width, whereas that of the comparative floor mat was 3.76 kgf/25 mm width.

Industrial Applicability

As stated above, the floor mat of the present invention contains the convex-concave structures in the belt-like portion. Therefore, in the press molding step, a greater pressure is applied to some parts of the bonding face of the laminate due to the convex-concave structures in a mold, and the peeling strength is enhanced overall. Further, a sufficient peeling strength can be obtained in the treatment for a short period of time, and the upper face layer suffers very little damage.

Further, the convex-concave structures impart the deformability and the form-stability to the belt-like portion of the floor mat of the present invention. Therefore, the floor mat can be placed in close contact with a floor wall or floor walls, whereby clods of soil or the like are not able to enter a space between the floor and the floor mat. Further, the belt-like portion has sufficient form-stability to hold clods of soil or the like on the plane section and prevent a scattering clods of soil or the like from the floor mat; and to avoid any sliding movements and curling of the floor mat. Furthermore, a treatment with a tape or an overlooking treatment at the peripheral edge in a conventional floor mat becomes unnecessary, the production process can be simplified, and the production cost reduced.

Although the present invention has been described with reference to specific embodiments, various changes and modifications obvious to those skilled in the art are deemed to be within the spirit, scope, and concept of the invention.

We claim:

1. A floor mat having an upper face layer and a base layer which comprises a plane section and a marginal peripheral section surrounding said plane section, wherein at least a part of said marginal peripheral section contains a belt portion which is raised at the side of said upper face layer and extends continuously and substantially in parallel to a marginal peripheral edge thereof; said belt portion contains a channel extending longitudinally thereof at the side of said base layer; said belt portion contains a deformable region and a form-stable region; and said belt portion carries at least one convex-concave structure on a wall surface of said channel, when said convex-concave structure extends transversely of said channel, said convex-concave structure is discontinuous on at least a bottom surface of said channel.

2. The floor mat according to claim 1, wherein said convex-concave structure is a structure projected from said wall surface of said channel.

3. The floor mat according to claim 1, wherein said convex-concave structure is a depression made in said wall surface of said channel.

4. The floor mat according to claim 3, wherein said depression is a groove.

5. The floor mat according to claim 1, wherein said convex-concave structure extends longitudinally of said belt portion.

6. The floor mat according to claim 1, wherein said convex-concave structure extends continuously and longitudinally of said belt portion.

7. The floor mat according to claim 1, wherein said belt portion carries said convex-concave structure on a sidewall surface of said channel at a marginal peripheral side thereof.

8. The floor mat according to claim 1, wherein said convex-concave structure extends longitudinally of said belt portion on said sidewall surface of said channel at said marginal peripheral side thereof.

9. The floor mat according to claim 1, wherein said convex-concave structure extends continuously and longitudinally of said belt portion on said sidewall surface of said channel at said marginal peripheral side thereof.

10. The floor mat according to claim 2, wherein said projected structure is a pressed portion which is raised at the side of said base layer, and has, at the side of said upper face layer, a recess having a shape corresponding to said raised portion; and a plurality of pressed portions are formed separately from each other.

11. The floor mat according to claim 1, wherein an edge at said plane section side of said belt portion is substantially parallel to an edge at said marginal peripheral section side of said belt portion.

12. The floor mat according to claim 2, wherein said projected structure is a ridge portion which extends continuously and longitudinally of said belt portion, and is carried on at least a part of one of said sidewall surfaces of said channel, a part of said bottom surface of said channel, or an area covering a part of one of said sidewall surfaces and a part continuous thereto of said bottom surface of said channel.

13. The floor mat according to claim 2, wherein said projected structure is a projected piece which is projected at the side of said base layer from at least a part of one of said sidewall surfaces of said channel, a part of said bottom surface of said channel, or an area covering at least a part of one of sidewall surfaces and a part continuous thereto of said bottom surface of said channel; and a plurality of projected pieces are formed separately from each other and discontinuously in a longitudinal direction of said belt portion.

14. The floor mat according to claim 2, wherein said channel carries a first group of a plurality of projected pieces which are projected at the side of said base layer from at least a part of one of said sidewall surfaces of said channel, or an area covering at least a part of one of said sidewall surfaces and a part continuous thereto of said bottom surface of said channel, and which are formed separately from each other and discontinuously in a longitudinal direction of said belt portion, and a second group of a plurality of projected pieces which are projected at the side of said base layer from at least a part of the other of said sidewall surfaces of said channel, or an area covering at least a part of the other of said sidewall surfaces and a part continuous thereto of said bottom surface of said channel, and which are formed separately from each other and discontinuously in a longitudinal direction of said belt portion; an end at a central side in a transverse direction of each of said projected pieces in one group is separated from an end at a central side in a transverse direction of each of said projected pieces in the other group so that each end does not come into contact with each other.

15. The floor mat according to claim 2, wherein said channel carries a first group of a plurality of projected pieces which are projected within said channel at the side of said base layer from at least a part of one of said sidewall surfaces of said channel, a part of said bottom surface of said channel, or an area covering at least a part of one of said sidewall surfaces and a part continuous thereto of said bottom surface of said channel, and which are formed separately from each other and discontinuously in a longitudinal direction of said belt portion, and a second group of a plurality of projected pieces which are projected within said channel at the side of said base layer from at least a part of the other of said sidewall surfaces of said channel, a part of said bottom surface of said channel, or an area covering at least a part of the other of said sidewall surfaces and a part continuous thereto of said bottom surface of said channel, and which are formed separately from each other and discontinuously in a longitudinal direction of said belt portion; and an end at a central side in a transverse direction of each of projected pieces in one group enters a gap formed between said projected pieces in the other group, respectively.

16. The floor mat according to claim 1, wherein at least one of a whole sidewall at said plane section side of said belt portion, a whole sidewall at said marginal peripheral edge side of said belt portion, or a whole ceiling of said belt portion has a thickness capable of maintaining a shape of said belt portion against a pressure applied thereto.

17. A process for producing a floor mat according to claim 1, comprising the steps of:

supplying a sheet material for said upper face layer together with a sheet material for said base layer to a mold for a press molding of said floor mat, said material for said base layer being maintained at a temperature at which a press molding can be carried out;

carrying out a press molding; and cutting a molded sheet to obtain said floor mat.

* * * * *